Patented May 15, 1951

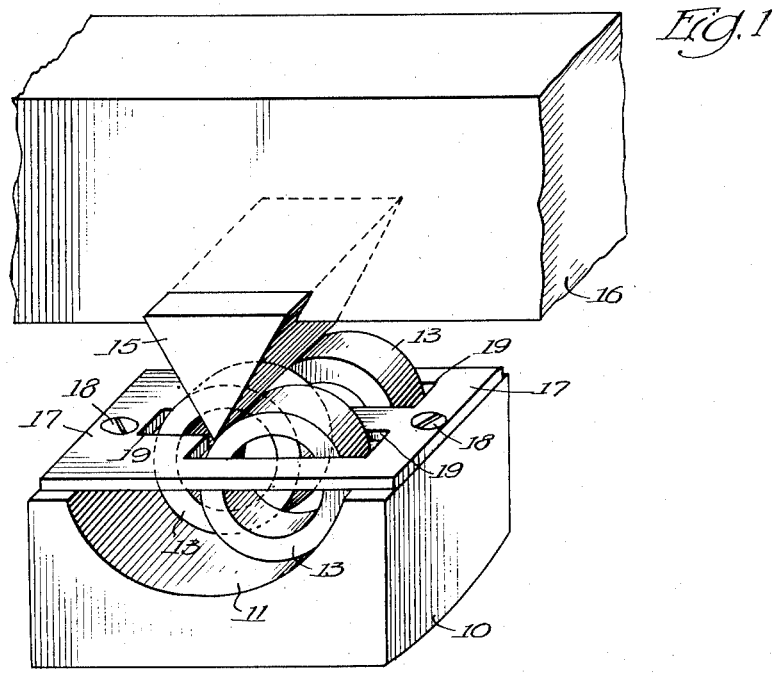
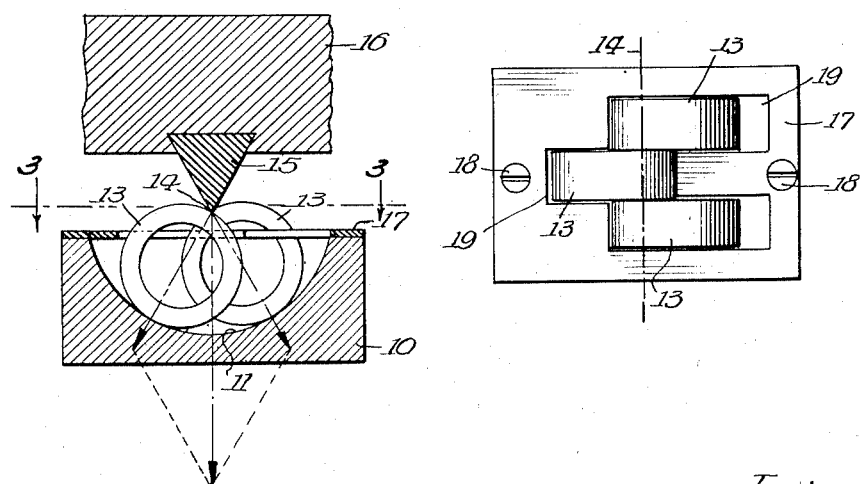

2,552,826

UNITED STATES PATENT OFFICE 2,552,826

KNIFE EDGE BEARING FOR SCALES

Adrianus van Duyn, Hillegersberg, Netherlands, assignor to U. S. Slicing Machine Company, Inc., a corporation of Indiana Application August 5, 1947, Serial No. 766,359
In Great Britain May 29, 1946

Section 1, Public Law 690, August 8, 1946
Patent expires May 29, 1966

6 Claims. (Cl. 308—2)

This invention relates in general to weighing scales, but more specifically to knife edge bearings for such scales, and one of the objects of the present invention is to provide such a bearing as will insure accuracy in fine weighing instruments, and which will be simple in construction and effective and efficient in operation.

A further object is to provide an improved bearing of this character which will be of a construction to minimize wear and tear.

A further object is to provide an improved bearing of this character in which the knife edge seats in a trough defined by overlapping arcuate surfaces of rolling members arranged one behind the other in mutually inclined relationship, said surfaces being displaceable transversely of the knife edge under rolling friction.

A further object is to provide an improved bearing of this character in which said members roll upon an arcuate track, the center of curvature of whose arc lies at the apex of said knifeedge.

To the attainment of these ends and the accomplishment of other new and useful objects, as will appear, the invention consists in the features of novelty in substantially the construction, combination and arrangement of the several parts, hereinafter more fully described and claimed and shown in the accompanying drawing, illustrating this invention, and in which Figure 1 is a perspective view of a bearing of this character constructed in accordance with the principles of this invention.

Figure 2 is a diagrammatic side elevational view of Figure 1.

Fig. 3 is a detail view looking in the direction of the arrows 3—3 of Fig. 2.

Referring more specifically to the drawing, the numeral 10 designates a supporting base having an arcuate track 11, opening through the top thereof, and 12, designates a plurality of rolling bearing members 13 mounted upon said track, which members may be annular or solid, and are arranged to form a trough therebetween, and which trough is defined by the arcuate surfaces of the members 13 overlapping each other.

These members are arranged one behind the other with their axes in staggered relationship, and the center of curvature of the arc of said track lies at the apex 14 of a knife edge 15, the knife edge being connected to a part of the scale shown in dotted lines and indicated by the numeral 16.

In the present embodiment of the invention the bearing members are in the form of three rings or hollow rollers, formed preferably of metal, and arranged one behind the other with their axes horizontal and parallel.

The two outer rollers or members 13, are arranged with their axes in alinement, while the axis of the middle roller is in the same plane as the axes of the other rollers but staggered, or spaced, horizontally therefrom.

The three rollers or members 13, are supported or borne by the upwardly opening arcuate track 11, thus being of part cylindrical shape, the axis of the cylinder or track 11, or center of curvature of the arc lying in the apex 14 of the usual V-shaped knife edge 15.

The rollers or members 13, are secured and maintained in position upon the track preferably by a plate or member 17, secured to the top of the track bearing member 10, by means of suitable fastening devices 18, such as screws and the like. This plate or member 17 is provided with slots 19 therein which allow the rollers or members 13, to roll on the track 11, but maintain them in their respective relative positions.

The knife edge 14, is supported in a trough, or the like, defined by the overlapping arcuate surfaces of the rollers or members 13, and as the knife edge turns, the advantage of rolling friction is obtained.

As a result of such a construction, wear and tear is minimized, and by turning of the rollers or members 13, parts thereof worn by the knife edge are replaced by new surfaces.

While the preferred form of the invention is herein shown and described, it is to be understood that various changes may be made in the details of construction and in the combination and arrangement of the several parts, within the scope of the claims, without departing from the spirit of this invention.

What is claimed as new is:

1. A knife edge bearing for scales and the like embodying a plurality of surfaces arranged one behind the other, in mutually inclined relationship to form a trough, means for supporting said surfaces, and a knife edge seated in said trough, said surfaces being displaceable upon said support, transversely of the knife edge under rolling friction, the surface of said support being arcuate, the center of whose curvature lies at the apex of said knife edge.

2. A knife edge bearing for scales and the like embodying a plurality of rollers arranged one behind the other and overlapping to form a trough, and a knife edge seated in said trough, a support for said rollers, said rollers being displaced with respect to each other to roll upon said support transversely of the knife edge under rolling friction, the surface of said support being arcuate, the center of which curvature lies at the apex of said knife edge.

3. A knife edge bearing for scales and the like embodying a plurality of rollers arranged one behind the other and overlapping to form a trough, a knife edge seated in said trough, a support for said rollers, said rollers being displaced with respect to each other to roll upon said support transversely of the knife edge under rolling friction, and a slotted plate secured to said support to extend thereacross and spaced therefrom for maintaining said rollers in their respective relative positions.

4. A knife edge bearing for scales and the like embodying a plurality of rollers arranged one behind the other and overlapping to form a trough, a knife edge seated in said trough, a support for said rollers, said rollers being displaced with respect to each other to roll upon said support transversely of the knife edge under rolling friction, and a retaining member carried by said support and provided with slots to receive said rollers and operating to maintain said rollers in their respective relative positions.

5. A knife edge bearing for scales and the like embodying a plurality of disk-like rollers arranged one behind the other and overlapping to form a trough, and a knife edge seated in said trough, a support for said rollers, said rollers being displaced with respect to each other to roll upon said support transversely of the knife edge under rolling friction, the surface of said support being arcuate, the center of which curvature lies at the apex of said knife edge, said rollers being supported entirely and only by their peripheries resting upon said support.

6. A knife edge bearing for scales and the like embodying a plurality of rollers arranged one behind the other and overlapping to form a trough, a knife edge seated in said trough, a support for said rollers, said rollers being displaced with respect to each other to roll upon said support under rolling friction and in a direction transversely of the knife edge, the surface of said support being arcuate, the center of which curvature lies at the apex of said knife edge, said rollers being supported entirely by their peripheries resting upon said support, and means carried by said support for maintaining said rollers in proper position with respect to each other and against displacement with respect to said support.

ADRIANUS van DUYN.

REFERENCES CITED

The following references are of record in the file of this patent:

UNITED STATES PATENTS

| Number | Name | Date |
| --- | --- | --- |
| 1,583,251 | Hem | May 4, 1926 |
| 2,387,202 | Williams | Oct. 16, 1945 |